Inventors:
Geoffrey W. Cope
George C. Skinner
By Wilmer Mecklin
their Attorney

April 14, 1970     G. W. COPE ET AL     3,506,139
AUTOMATIC ELECTRIC COUPLER

Filed Feb. 6, 1968     3 Sheets-Sheet 2

Inventors:
Geoffrey W. Cope
George C. Skinner
By Wilmer Mechlin
their Attorney

Inventors:
Geoffrey W. Cope
George C. Skinner
By Wilmer Mecklin
their Attorney

United States Patent Office 3,506,139
Patented Apr. 14, 1970

3,506,139
AUTOMATIC ELECTRIC COUPLER
Geoffrey W. Cope, Williamsville, and George C. Skinner, Elma, N.Y., assignors to Dresser Industries, Inc., a corporation of Delaware
Filed Feb. 6, 1968, Ser. No. 703,375
Int. Cl. B61g 5/06; H01r 13/44, 25/00
U.S. Cl. 213—1.3                                            10 Claims

ABSTRACT OF THE DISCLOSURE

An electric coupler mountable on a mechanical railway coupler as part of a coupler assembly for automatically connecting electric lines between cars incident to their mechanical coupling, the coupler combining normally projected end contactable pins for non-arcing amperage lines with hermaphroditic fixed socket and retractable pin contacts for lines carrying arcing amperages, the sockets of which are automatically cleaned on coupling, the several contacts being energizable before coupling without producing external arcing during coupling.

BACKGROUND OF THE INVENTION

In subway cars it has long been the practice to provide for automatic coupling of train electric and air lines incident to mechanical coupling by mounting air and electric couplers at ends of within-car sections of the lines on the head of each mechanical coupler. A subway train will usually have only two air lines and the air couplers therefore can readily be mounted in vertically spaced relation on the vertical longitudinal centerplane of the mechanical coupler so as to couple with the corresponding air coupler of another car regardless of the ends of the cars presented for coupling. However, the electric train lines are relatively too numerous for all to be so centered and each, therefore, customarily is formed by a pair of electrically connected contacts at opposite sides of the center-plane to ensure proper coupling of the corresponding lines on each car, no matter which end thereof is being coupled. At an early stage in the development of such electric couplers, it was proposed in Tomlinson Patent No. 1,422,241, issued July 11, 1922, to form the pair of contacts for each line by a pair of connected rings with normally retracted pins received in the rings at one side of the center-plane and projectable forwardly into the empty rings at the confronting side of a mating electric coupler. If ever used, this Tomlinson electric coupler was soon supplanted by the conventional electric coupler in which the contacts are all normally projected and arcing is prevented by using a drum switch to energize the contacts only when they are coupled to the corresponding contacts of a mating electric coupler.

Most recently, there has been wide-spread adoption for subway cars of the automatic electric coupler disclosed in Gobrecht Patent No. 3,277,421, issued Oct. 4, 1966. As disclosed in the patent, the electric coupler is mounted on a mechanical coupler also mounting air couplers for train air lines and forms with those couplers a combined mechanical, air and electric coupler. The electric coupler has contacts for both train service lines and lines directly involved in automatic coupling and uncoupling and follows conventional practice in using as its contacts for each line a pair of end contactable contact pins mounted in an insulator block at opposite sides of the coupler's vertical longitudinal center-plane, but differs therefrom in dispensing with a drum switch and having its contacts energized whenever the associated lines are live. This it does without arcing on coupling by normally retracting within the insulator block the contacts for the train electric service lines which carry arcing amperages and projecting those contacts into contact with the corresponding contacts of the mating coupler after the mechanical couplers mounting them have been coupled. By contrast the contacts for the automatic coupling and uncoupling lines normally project forwardly from the insulator block and are saved from arcing by the coupling and uncoupling circuitry disclosed in the patent which depends for power upon air pressure and, by restricting the use of electricity to pilot valve operation, limits the currents in the electric lines thereof to non-arcing amperages. The present invention is primarily concerned with improving upon the Gobrecht electric coupler.

SUMMARY OF THE INVENTION

The primary object of the present invention is to provide in a railway coupler assembly an improved automatic electric coupler which by using normally projected end contactable contacts for non-arcing amperages and hermaphroditic fixed socket and reciprocable pin contacts for arcing amperages, halves over the Gobrecht coupler the number of arcing amperage contacts required normally to be retracted, while retaining the ability of that coupler to couple without arcing.

Another object of the invention is to provide an improved automatic electric coupler having hermaphroditic fixed socket and retractable pin contacts for arcing amp erages, the sockets of which are so constructed as automatically to be cleaned of any foreign matter in a coupling operation.

Combining normally projected end contactable contacts for non-arcing amperage lines with hermaphroditic fixed socket and retractable pin contacts for arcing amperage lines, the improved automatic electric coupler has the several contacts mounted in an insulator block in a housing, which in turn is mountable on a mechanical coupler usually also mounting air couplers. Slidable in the block, the retractable pin contacts are attached rearwardly thereof to a carriage in and shiftable on guides longitudinally of the box and normally yieldably held in retracted position and projectable forwardly by fluid pressure to project the pins into the corresponding sockets of a mating coupler. Preferably having the retractable pin contacts and fixed socket contacts at opposite sides of its vertical longitudinal center-plane, the improved coupler encumbers only one side of the space within the housing with the carriage for the retractable pins and its operating mechanism and has each pin contact connected within the housing to the paired socket contact, thus not only simplifying the coupler's structure but making the space at the opposite side available for the leads into the box of the related lines and facilitating wiring in both assembly and maintenance. Even though the contacts are covered by a suitable cover when not in use, the socket contacts may become plugged by foreign matter seeping around the cover and any detriment from this source to proper contact on coupling is avoided by providing each socket contact rearwardly of the insulator block with a discharge opening through which foreign matter will automatically be ejected by the corresponding pin contact of the mating coupler in the ensuing coupling operation.

Other objects and features of the invention will appear hereinafter in the detailed description, be particularly pointed out in the appended claims and be illustrated in the accompanying drawings, in which:

FIGURE DESCRIPTION

GENERAL DESCRIPTION

Figure 1:
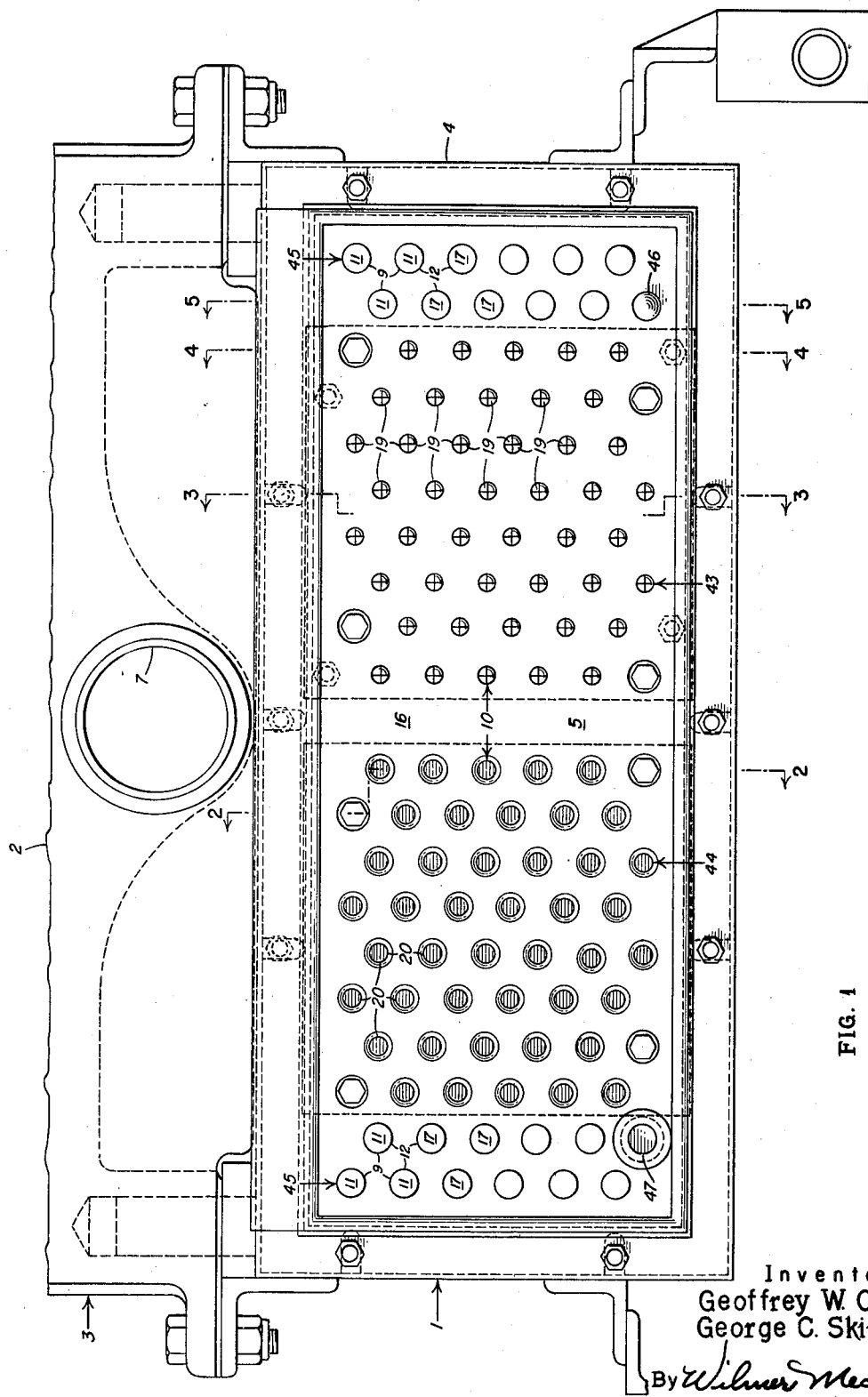
FIGURE 1 is a front elevational view of a preferred embodiment of the improved automatic electric coupler of the present invention mounted on a suitable mechanical coupler and with the cover removed.
Figure 2:
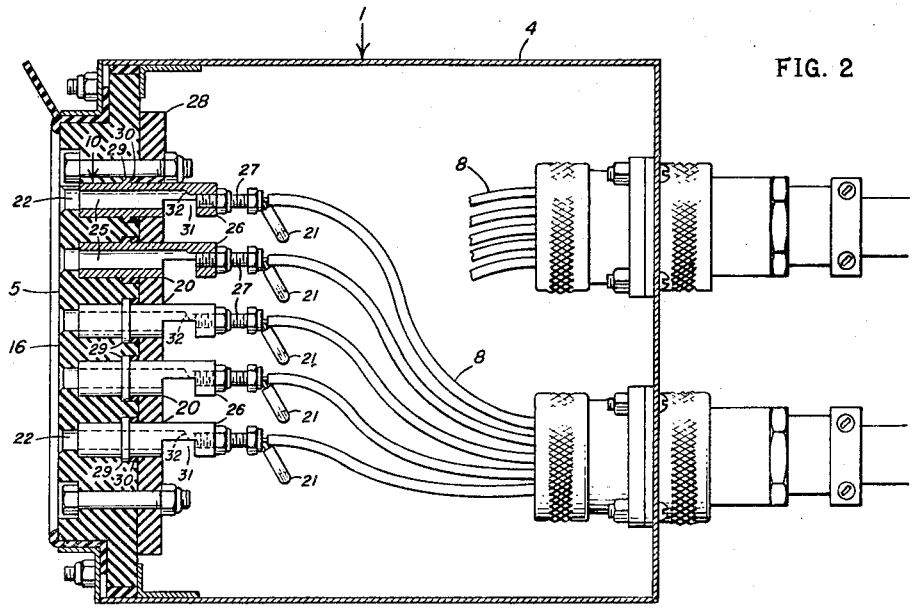
FIGURE 2 is a vertical sectional view taken along lines 2—2 of FIGURE 1.
Figure 6:
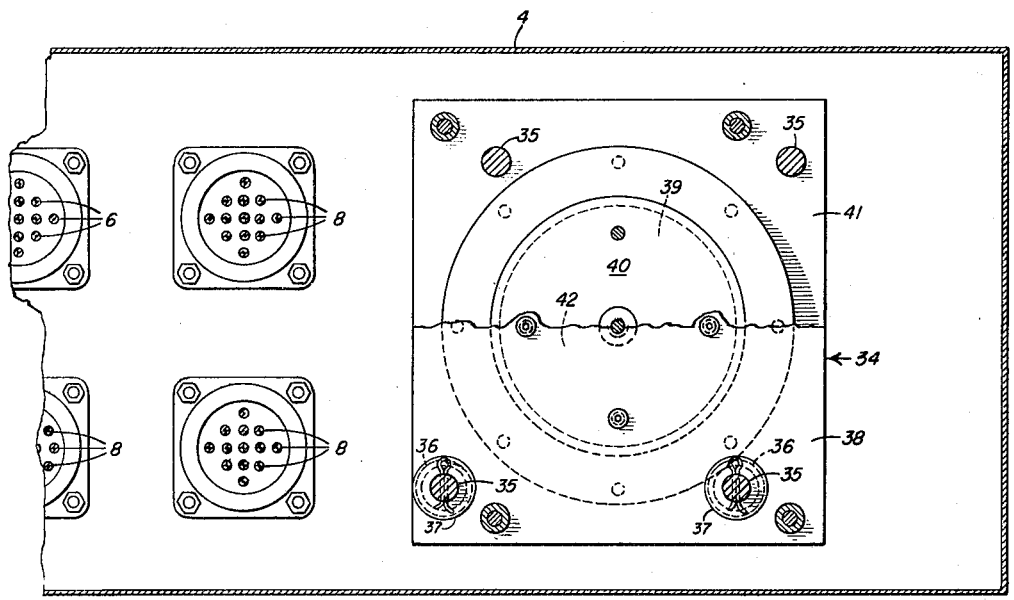
FIGURE 6 is the fragmentary vertical sectional view taken along lines 6—6 of FIGURE 3.

Referring now in detail to the drawings in which like reference characters designate like parts, the improved automatic electric coupler of the present invention is particularly designed for mounting on a mechanical railway coupler as part of a coupler assembly for automatically coupling electric lines between cars incident to their mechanical coupling. As exemplary of the invention, the improved coupler, designated as 1, is shown as mounted on or suspended from the bottom of the head 2 of a suitable automatic hook type coupler 3, such as disclosed in Cope copending application Ser. No. 665,863, filed Sept. 6, 1967, now Patent No. 3,438,511, and usually will be equipped with a cover (not shown) at the front, of which a suitable type is disclosed in that patent.

The improved electric coupler 1 is comprised of a box or housing 4 in the otherwise open front end of which is releasably mounted an insulator block 5. In that block are mounted in laterally spaced, electrically insulated relation a plurality of contacts, each couplable or contactable with a confronting or mating contact of a mating electric coupler. As in the Gobrecht patent, it is contemplated that the contacts be of two types, one for connecting non-arcing amperage electric lines 6, such as those involved in the automatic coupling and uncoupling of the mechanical and electric couplers 3 and 1, as well as air couplers 7 which usually will be mounted in the head 2. The other type are for arcing amperage electric lines 8, such as the train electric lines.

Following the Gobrecht coupler upon which it improves, the electric coupler 1 of this invention is intended to couple without arcing with a mating electric coupler without depending upon a drum switch for deenergizing the contacts except when they are coupled, and the non-arcing and arcing amperage contacts 9 and 10 for the non-arcing and arcing amperage lines 6 and 8, respectively, are particularly designed for that purpose. As explained at the outset of this application, there ordinarily will be more lines to connect than could be accommodated by a single vertical row of contacts extending along the coupler's vertical longitudinal center-plane and if, as in the illustrated embodiment, no contacts are so positioned, the contacts for each line must be an electrically connected pair at opposite sides of the center-plane for enabling corresponding lines to be connected regardless of the end of a car presented for coupling.

The non-arcing amperage contacts 9 of the preferred type are end-contactable contact pins having substantially flat-faced or ended frusto-conical heads 11 fitting in forwardly opening sockets 12 in the insulator block 5 and relatively reduced stems 13 extending rearwardly through the block and fitted at the rear for connection to the related non-arcing amperage electric lines 6, one half directly and the other half through jumper cables or leads 14 connecting them within the box 4 to the contacts paired therewith of the first half. Springs 15 in and acting between the bases of the sockets 12 and the heads 11 normally project or urge the latter forwardly of the suitably vertical and flat front face 16 of the block 5 for the contact of their substantially flat front ends 17 with like ends of corresponding contacts of the mating coupler in a coupling operation. Limited in their forward projection by suitable stops 18 on their stems 13, the contacts 9, on contact with mating, like or corresponding contacts of a mating coupler, are yieldable or depressable rearwardly against their springs 15 and then held by the springs in tight end contact with the mating contacts.

The preferred arcing amperage contacts 10 are in effect hermaphroditic contacts formed for each arcing amperage electric line 8 of a retractable male element or contact pin 19 and a fixed or stationary female element or socket contact 20 at opposite sides of the coupler's vertical longitudinal center-plane and electrically connected as a pair within the box 4 by a jumper cable or lead 21. Both the retractable pins 19 and the stationary socket contacts 20 seat or are received in apertures 22 extending through the insulator block 5 normal to its front face 16 and both project or extend rearwardly beyond the block and are fitted at the rear for electrical connection, the sockets directly to the related electric lines 8 and the pins to the paired sockets. The socket contacts 20 are fixed or stationarily mounted in their apertures and inset or retracted therein rearwardly of the block's front face 16, while the retractable pins 19 are slidable, shiftable or reciprocable axially of themselves and longitudinally of the box 4 in their apertures. Retracted in normal or uncoupled position into the insulator block 5 with their front ends 23 inside the front face 16, the pins 19, when coupled, are projected forwardly from that face and have their front portions socketed or received in the corresponding sockets of the mating coupler. Round-nosed or rounded front-ended to facilitate their entry first into the apertures and then the inset sockets in the mating coupler, the pins for tight peripheral contact with the sockets preferably have receivable therein resilient, radially compressible front portions 24 conveniently formed by axially slit spring caps applied over solid cores.

The preferred companion socket contacts 20 are cylindrical cups or sleeves having bores 25 open at the front for receiving the pins of a mating coupler and closed at the rear by rear walls 26 into which conveniently are threaded binding posts 27 for connection of the jumper cables 21 and lines 8. Suitably made from solid bar stock and bored or drilled from the front to form their boxes 25, the cups 20 are insertable from the rear into the insulator block 5 into rearward enlargements of their apertures 22 and mounted against relative axial and rotative movement in the block, suitably by a common clamping plate 28 bolted to the back of the block and applying clamping pressure against peripheral flanges on the cups forwardly thereof through interposed elastic O-rings 30. Both the cups 20 and their bores 25 project or extend rearwardly beyond the clamping plate 28 and, therebetween and the cups' rear walls 26, are radially slotted upwardly substantially to their centers to form clean-out or discharge slots, outlets or openings 31 opening downwardly from the rear portions of the bores. With such slots 31 and the in-built baffles or deflectors thereabove formed by the conically concave rear ends 32 of the drilled bores 25, any foreign matter entering the bores or the apertures 22 therefor in the insulator block 5 between couplings will automatically be cleaned therefrom and ejected or pushed out through the slots by the pins of the mating coupler in the next coupling operation and thus prevented from impairing the electrical contact between the pins and the cups.

For projecting and retracting them, respectively in coupling and uncoupling operations, the pins 19, rearwardly of the insulator block 5, are fixed, attached or connected for longitudinal movement in unison to an insulator plate 33 forming the front part of a carriage 34 slidable or reciprocable longitudinally in the box 4 on guides or guide posts 35. Return springs 36 encircling the guide posts and acting against stops 37 thereon and rearwardly on a rear wall or plate 38 of the carriage 34, normally yieldably hold the pins in a retracted position inside or rearwardly of the front end 16 of the insulator block 5. Power for projecting the pins 19 is provided by fluid pressure injected into a pressure chamber 39 in the box 4 rearwardly of the carriage 34 and closed at the sides and forwardly conveniently by a rolling diaphragm 40 peripherally clamped to a plate 41 backing the pressure chamber. Contained when applied by the diaphragm 40, fluid pressure applies a forward or projecting force to the carriage through a piston or push block 42 conveniently bolted at the front to the back of the rear plate 38 and clamped at the back to the front end of the diaphragm.

Simplified over the electric coupler of the Gobrecht patent in requiring only a half of the contacts 10 for the arcing amperage electric lines 8 to be shiftable, the improved coupler 1 is further simplified in its construction and the wiring of its several contacts 9 and 10 by arranging or positioning all of its retractable pin contacts 19 in one and its socket contacts 20 in the other of a pair of contact banks 43 and 44, respectively, at opposite sides of the coupler's vertical longitudinal center-plane. This makes it possible to limit the carriage 34 to the side of the box 4 on which is located the pin contact bank 43 for leading the several electric lines 6 and 8 into the box, thus greatly facilitating both the wiring of the coupler and assembly and maintenance of its various components. The counterpart non-arcing amperage contacts 9, if, as illustrated, too numerous for all to be arranged in vertical alignment along the coupler's center plane, also may be arranged in a pair of banks 45 at opposite sides of that plane and, as preferred, the banks 45 can either straddle or be straddled by the banks 43 and 44.

In a coupling operation it is contemplated that the non-arcing amperage contacts 9 will contact the corresponding contacts of the mating electric coupler as the associated mechanical couplers 3 approach coupled position and at a time when the mechanical couplers have their heads 2 substantially aligned vertically and laterally with or centered on each other by their aligning pins or other suitable aligning devices (not shown). Particularly when the mechanical couplers are of the hook type, their alignment by their aligning devices will ordinarily suffice to align the electric couplers, although, if desired, the aligning action of those devices can be supplemented by providing the electric couplers themselves with aligning pins and sockets 46 and 47, respectively. In any case, once the non-arcing amperage contacts 9 of the pair of electric couplers have coupled or contacted, current is free to flow therethrough between the related non-arcing amperage electric lines 6 and, even though the lines on only one of the cars ordinarily will be live prior to coupling, both sets of lines and their contacts will be energized in the course of the mechanical coupling and remain in that condition until contact between the contacts is broken in the next uncoupling operation.

Figure 7:
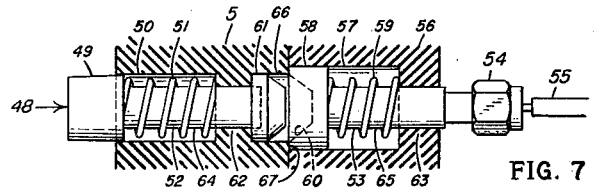
FIGURE 7 is a fragmentary vertical sectional view on the section of FIGURE 5, showing an alternate form of normally projected contact pin.
Figure 5:
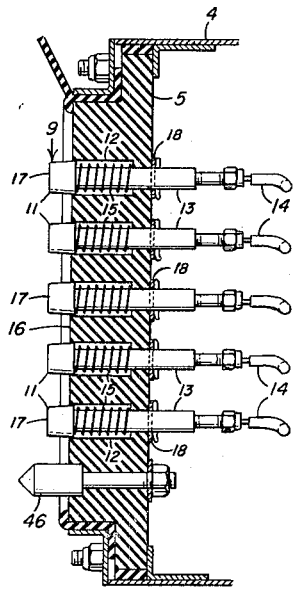
FIGURE 5 is a fragmentary vertical sectional view taken along lines 5—5 of FIGURE 1.
Figure 4:
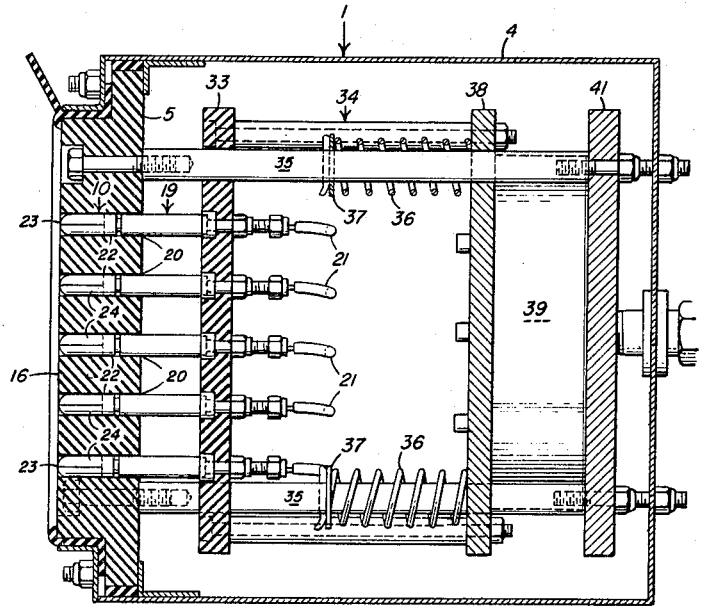
FIGURE 4 is a vertical sectional view taken along lines 4—4 of FIGURE 1 with the retractable pins in their normal retracted position.
Figure 3:
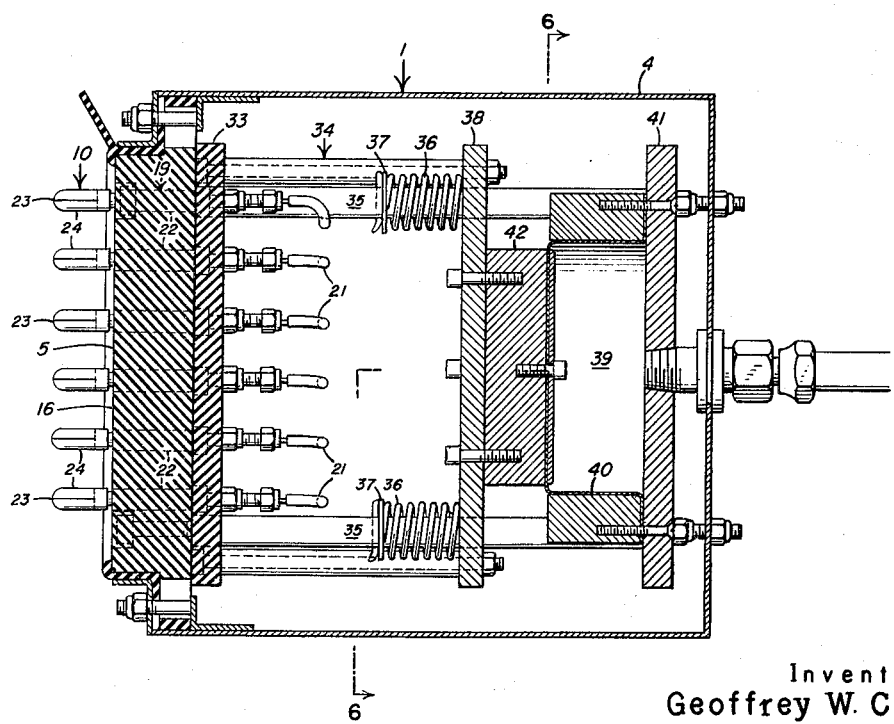
FIGURE 3 is a vertical sectional view taken along lines 3—3 of FIGURE 1 and showing the retractable pin contacts in projected position.

As in the coupler of the Gobrecht patent, electrical energy therefore is available at the required times in the circuitry of both of the electric couplers for performing automatically in the required sequences the several operations involved in coupling and uncoupling and, if the circuitry is similar to that shown in FIGURE 7 of the Gobrecht patent with the electrical energy only piloting the fluid power by which the operations are produced, the amperage of the current at the normally projected contacts 9 will be non-arcing. However, should it be desired, instead, to perform one or more of the coupling and uncoupling operations by electric rather than fluid power, with consequent increase in the amperage of the current to arcing level in one or more of the contacts 9, such contacts still can normally be projected and danger to personnel or of shorting when uncoupled and external arcing on coupling can be avoided without resorting to a drum switch by substituting for any such contact an alternate normally projected contact 48.

As shown in FIGURE 7, the alternate contact 48 resembles the contact 9 in having a head 49 depressible into a forwardly opening socket 50 in the insulator block 5 and normally projected forwardly therefrom by a spring 51 for contact during mechanical coupling with a corresponding or mating contact of a mating coupler. However, while the electric line to which the contact is connected may be live, its head 49 is neither energized nor energizable in its normal projected position and thus is de-energized both normally or when uncoupled and on initial end contact with a mating contact. This is accomplished by forming the contact of axially aligned or in tandem, normally axially spaced and electrically disconnected front and rear pins or pin parts 52 and 53 respectively, the former having the head 49 at the front and the latter carrying or mounting at the rear a binding post or fitting 54 for electrical connection to the related, permissively arcing amperage electric line 55.

For assembly purposes the insulator block 5, when using the alternate pin 48, is backed by a supplemental or auxiliary insulator block 56 and a forwardly opening socket 57 in the latter block seats a collar 58 on the front of the rear pin 53. Normally urged forwardly by a spring 59 in its socket 57 against the back of the main insulator block 5, the collar 58 presents at the front a preferably frustoconically concave seat 60 for receiving or seating a correspondingly convex plug 61 at the rear of the front pin 52. Apertured webs or walls 62 and 63 respectively in the main block 5 between the plug 61 and the head 49 of the front pin 52 and on the auxiliary block 56 back the adjoining sockets 50 and 57 and the springs 51 and 59 therein, while passing the pins' stems 64 and 65. A rearwardly opening socket 66 in the main block at the rear of the web 62 seats the plug 61 and it and the plug are both of less diameter than the collar 58 and its socket 57 for exposing an annular stop surface 67 for the collar on the back of the main block.

While the normal air gap between the confronting contact surfaces of the collar 58 and plug 61 is predetermined to prevent energizing of the front pin 52 through the rear pin 53 on initial contact of the head 49 with that of a mating contact, it preferably also is predetermined to close and permit current to flow between the front and rear pins in the interval between the initial contact and the completion of the mechanical coupling of the associated mechanical couplers 3, so as to enable the operations involved in the total coupling to be performed automatically in the sequence produced by the circuitry of the Gobrecht patent. The depressibility against yieldable resistance first of the front pin and then of both pins in unison under the force applied in a coupling operation to the front pin, permits the desired intermediate energizing of the front pin, as well as ensuring solid electrical contact between the pins and a flow-path for current therethrough when the coupler is coupled.

Regardless of the applied amperage, the only arcing that can occur is between the confronting contact surfaces on the collar 58 and plug 61 and, as these surfaces are embedded in and completely surrounded by the insulator blocks 5 and 56, any arcing that does occur will be smothered within the blocks and cannot adversely affect any other contact or electric line connected thereto. The relatively rapid projection and retraction of the normally retracted pins 19 of the hermaphroditic arcing amperage contacts 10 will reduce correspondingly the likelihood of arcing on coupling between them and the socket contacts of the mating coupler, but in their case, as well, any arcing that does occur will be inside the insulator block 5 and effectively smothered thereby.

As mentioned earlier, the front end of the box 4 will be covered by a cover (not shown) when the improved coupler is uncoupled to protect the contacts 9 and 10 from the elements and the cover suitably may be of the type disclosed in the Cope copending application Ser. No. 655,863 and adapted to be swung automatically out of the way as the mating couplers approach in a coupling operation and back to closed position on separation of the couplers in an uncoupling operation. As a coupling operation continues beyond the uncovering stage, the first contact will be between the normally projected, end contactable contacts 9 or 48 of the mating couplers for supplying current to the related and otherwise usually dead lines of the coupling circuit of one of the cars. As in the Gobrecht patent, each circuit, when energized in a coupling operation will cause the various operations or actions involved in mechanical and electrical coupling automatically to be performed in the desired sequence, including, after the mechanical coupling has been completed, projection of the normally retracted pin contacts 19 of the two couplers into the confronting socket contacts 20 thereof for connecting the train service electric lines of the two cars. Conversely, in uncoupling, the retractable pins 19 will be retracted at the outset of the uncoupling operation and thereafter remain within the insulator blocks of their respective couplers until the latter are next coupled. For good conductivity when coupled, the several contacts 9, 19, 20 and 48 suitably may be made of brass with their contact surfaces silver-plated.

From the above detailed description it will be apparent that there has been provided an improved automatic electric coupler which, without resort to a drum switch, effectively prevents external, potentially dangerous arcing on both coupling and uncoupling. It should be understood that the described and disclosed embodiment is merely exemplary of the invention and that all modifications are intended to be included that do not depart from the spirit of the invention.

Having now described our invention we claim:

1. In a railway coupler assembly including a mechanical coupler for automatic mechanical coupling to a mating assembly, an electric coupler comprising insulator means, a plurality of contacts mounted in and normally projecting forwardly from said insulator means for contact with corresponding contacts of a mating electric coupler of said mating assembly during mechanical coupling of said assemblies, and a plurality of hermaphroditic contacts contactable with corresponding contacts of said mating electric coupler only when said assemblies are mechanically coupled, the several contacts of said plurality each being electrically connected to a related electric line, and said hermaphroditic contacts each formed of an electrically connected pair of contact members one a socket member stationarily mounted in said insulator means rearwardly of a front face thereof and the other a pin member normally retracted rearwardly into said insulator means and projectable forwardly thereof into a socket member of a corresponding hermaphroditic contact of said mating electric coupler.

2. An electric coupler according to claim 1, wherein each socket member receives a mating pin member of the mating electric coupler in a forwardly opening socket, and said socket opens rearwardly beyond the insulator means for automatic cleaning therefrom of any foreign matter therein on projection of said mating pin member thereinto.

3. An electric coupler according to claim 2, wherein the socket members have electrical fittings thereon rearwardly beyond the insulator means, and the sockets thereof open rearwardly of the insulator means through downwardly opening radial openings positioned between said fittings and the insulator means.

4. An electric coupler according to claim 1, including a housing mounting the insulator means in a front portion thereof, wherein the pin members and the socket members are mounted in said housing at opposite sides of a vertical longitudinal center-plane of said coupler, and including means in said housing rearwardly of said insulator means and on the same side thereof as and connected to the pin members for projecting and retracting the pin members in unison.

5. An electric coupler according to claim 4, wherein the projecting and retracting means include a fluid pressure-advanced, spring-retracted carriage reciprocable longitudinally of the housing and insulatedly connected to the pin members.

6. An electric coupler according to claim 5, wherein the socket members are directly connected to the related electric lines, and including connecting lines electrically connecting the pin members to the related electric lines through the paired socket members.

7. An electric coupler according to claim 6, wherein the normally projected contacts are end contactable with corresponding contacts of the mating electric coupler, each normally projected contact is on a side and paired with and electrically connected to a normally projected contact on an opposite side of the center-plane, and the normally projected contacts on the same side as the socket members are directly connected to the related electric lines.

8. An electric coupler according to claim 1, wherein the normally projected contacts are end contactable with corresponding contacts of the mating electric coupler, the normally projected contacts are electrically connected in whole to the related electric lines, and the related electric lines when energized carry non-arcing amperages.

9. An electric coupler according to claim 1, wherein the normally projected contacts each include axially aligned front and rear pins respectively having a head end contactable with a mating contact of the mating electric coupler and carrying an electrical fitting for connection to a related electric line, said front and rear pin being depressible rearwardly against yieldable resistance and normally being axially spaced and electrically disconnected, and said front and rear pins on depressing of said front pin during mechanical coupling contacting for electrically connecting said head to the electric line and thereafter to completion of the mechanical coupling being depressed in unison.

10. An electric coupler according to claim 9, wherein the front and rear pins of each normally projected contact are end contactable during mechanical coupling through a tapered concave seat on one and a correspondingly tapered convex plug on the other of their adjoining ends.

References Cited

UNITED STATES PATENTS

| | | | |
|---|---|---|---|
| 1,039,147 | 9/1912 | Le Compte et al. | 213—76 |
| 1,223,222 | 4/1917 | Tomlinson | 339—35 X |
| 1,227,375 | 5/1917 | Boirault | 213—1.3 |
| 1,300,789 | 4/1919 | Tomlinson | 213—1.3 X |
| 1,422,241 | 7/1922 | Tomlinson | 339—35 X |
| 2,883,069 | 4/1959 | Candlin et al. | 213—1.3 |
| 3,277,421 | 10/1966 | Gobrecht | 339—48 |

RICHARD E. MOORE, Primary Examiner

P. A. CLIFFORD, Assistant Examiner

U.S. Cl. X.R.

339—35, 48; 213—76